United States Patent [19]
Sekine et al.

[11] Patent Number: 5,907,434
[45] Date of Patent: *May 25, 1999

[54] IMAGE PICKUP APPARATUS

[75] Inventors: Masayoshi Sekine, Tokyo; Shigeki Okauchi, Kodaira; Makoto Sekita, Yokohama; Tatsushi Katayama, Tokyo; Katsuhiko Mori, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/619,791

[22] Filed: Mar. 20, 1996

[30] Foreign Application Priority Data

Mar. 20, 1995 [JP] Japan .................................. 7-061122

[51] Int. Cl.$^6$ ........................... G02B 27/22; G02B 27/10; G02B 27/12; H04N 5/225
[52] U.S. Cl. ......................... 359/462; 359/464; 359/465; 359/618; 359/639; 359/636; 348/335; 348/344
[58] Field of Search ..................... 359/376, 377, 359/378, 462, 464, 465, 618, 625, 627, 629, 633, 636, 638, 639, 640, 626; 348/264, 51, 218, 335, 344, 343, 357

[56] References Cited

U.S. PATENT DOCUMENTS

| | | | |
|---|---|---|---|
| 5,003,385 | 3/1991 | Sudo | 359/464 |
| 5,099,317 | 3/1992 | Takemura | 358/44 |
| 5,436,661 | 7/1995 | Yamamoto et al. | 348/264 |
| 5,499,051 | 3/1996 | Suda et al. | 359/462 |
| 5,522,789 | 6/1996 | Takahashi | 359/377 |

FOREIGN PATENT DOCUMENTS 5-344422  12/1993  Japan .

*Primary Examiner*—Cassandra Spyrou
*Assistant Examiner*—Audrey Chang
*Attorney, Agent, or Firm*—Fitzpatrick,Cella,Harper & Scinto

[57] ABSTRACT

For providing a compact, light, and cheap image pickup apparatus capable of attaining both a stereoscopic image and a high-definition plane image by itself, a changeover optical unit is provided with both a function to attain a stereoscopic image by guiding beams captured through objective lenses to respective CCDs and a function to attain a plane image by splitting the beam captured through the objective lens into two beams and guiding the two beams to the CCDs whereby the stereoscopic image and the high-definition plane image can be attained by proper changeover between these functions.

29 Claims, 12 Drawing Sheets

IMAGE OF 601
(LEFT LENS)

IMAGE OF 602
(RIGHT LENS)

IMAGE PICKUP APPARATUS

BACKGROUND OF THE INVENTION

1. Field of the Invention

The present invention relates to an image pickup apparatus for attaining a high-definition plane image, and an image pickup apparatus capable of attaining both a stereoscopic image and a high-definition plane image by itself.

2. Related Background Art

Japanese Laid-open Patent Application No. 5-344422 discloses the image pickup apparatus for obtaining the high-definition plane image in such a manner that a multi-eye image pickup system with left and right pickup systems is used to obtain two image information sets; a correlation arithmetic is carried out for the two image information sets obtained, to attain position information of an object; an angle between the optical axes of the both pickup systems, which is an angle of vergence, is controlled based on the position information; and pixels composing one of the two images are superimposed with a shift of the half pitch on those composing the other, thereby obtaining the high-definition plane image. This image pickup apparatus can operate as a stereoscopic camera well known, by changing over the operation of processing circuits and separately taking image signals of the two pickup systems out.

The multi-eye image pickup apparatus as described in the above Japanese application, however, required accurate control of the vergence angle in order to attain high-definition plane images for objects at various distances, which resulted in needing a high-accuracy positioning mechanism, disadvantegeously causing an increase in the size, weight, and cost of the whole image pickup apparatus.

The above multi-eye image pickup apparatus also had the problems of high cost and high dissipation power because a correlation arithmetic circuit for the two image information sets obtained from the multi-eye pickup system is complex and because throughput of this circuit is enormous The same problems were also caused by an image synthesizing circuit used for superposition of images.

The above multi-eye image pickup apparatus needed to use expensive lenses with little aberration and with little production error with regard to focal length, because high-accuracy image synthesis could not be expected if the left and right pickup systems in the multi-eye image pickup system had different aberration characteristics or different focal lengths.

SUMMARY OF THE INVENTION

A principal object of the present invention is thus to provide a compact, light, and cheap image pickup apparatus for achieving high-definition plane image, and to provide a compact, light, and cheap image pickup apparatus capable of gaining both the stereoscopic image and the high-definition plane image.

In order to achieve the above object, one aspect of the present invention is an image pickup apparatus comprising: a plurality of lenses for capturing beams from an object; a plurality of image pickup elements for converting said beams into electric signals; and changeover optical means having first means for guiding the beams captured through said plurality of lenses to said image pickup elements associated therewith, and second means for splitting a beam captured through either one of said lenses into two beams to guide the two beams to at least two out of said image pickup elements, said changeover optical means letting either one means selectively function through changeover between said first and second means.

Another aspect of the invention is the image pickup apparatus wherein color filters are set for respective pickup surfaces of said plurality of image pickup elements, each of said color filters is an array of a plurality of filter elements, each transmitting predetermined color light, said array including plural elements corresponding to pixels in a predetermined sequence in a horizontal direction and plural elements corresponding to pixels in a predetermined sequence in a vertical direction, and said plurality of image pickup elements are positioned so that a point of said object may form images thereof shifted by a predetermined pixel pitch in the horizontal direction on said respective color filters.

Another aspect of the invention is the image pickup apparatus wherein said plurality of image pickup elements are driven by same clock.

Still another aspect of the invention is the image pickup apparatus wherein said lenses and said image pickup elements are two lenses and two image pickup elements.

Still another aspect of the invention is the image pickup apparatus wherein two beams captured through two said lenses are guided to cross each other and said changeover optical means is positioned at a crossing position of the two beams.

Another aspect of the invention is the image pickup apparatus wherein said first means and said second means each have optical low-pass filters with mutually different characteristics in optical paths and said optical low-pass filters are interchanged with each other as interlocked with a changeover member for changeover between said first means and said second means.

Another aspect of the invention is the image pickup apparatus which is arranged as capable of controlling an angle on the object side between the two beams captured through two said lenses.

Another aspect of the invention is the image pickup apparatus wherein said image pickup elements are image pickup elements having more pixels than pixels corresponding to standard signals and said controlling the angle is substantially effected by moving read-out areas of outputs from the image pickup elements.

Another aspect of the invention is the image pickup apparatus wherein said controlling the angle is effected by moving said lenses in directions nearly perpendicular to directions of incidence of the beams into said lenses.

Another aspect of the invention is the image pickup apparatus wherein variable apical-angle prisms are provided before said lenses and said controlling the angle is effected by changing apical angles of said variable apical-angle prisms.

Another aspect of the invention is the image pickup apparatus wherein said controlling the angle is substantially effected by moving said image pickup elements in directions substantially perpendicular to directions of incidence of the beams into said image pickup elements.

Another aspect of the invention is the image pickup apparatus wherein said first means and said second means have respective optical axes coincident with each other and optical pathlengths equal to each other.

Another aspect of the invention is the image pickup apparatus wherein changes of optical axes and optical pathlengths caused by changeover between said first means and said second means are corrected by adjusting a position of at least one of said lenses, said changeover optical means, and said image pickup elements.

Another aspect of the invention is the image pickup apparatus wherein at least one of the beams captured through said lenses can be interrupted at a position before said beam reaches said changeover optical means.

Another aspect of the invention is the image pickup apparatus wherein images position-reversed between said lenses and said image pickup elements can be corrected by image position-reverse means set after said image pickup elements.

Another aspect of the invention is the image pickup apparatus wherein positions of images formed on pickup surfaces of said image pickup elements can be changed by changing at least either one of relative positions of said plurality of image pickup elements and a position of said changeover optical means.

Another aspect of the invention is the image pickup apparatus wherein positions of images formed on pickup surfaces of said image pickup elements can be changed by changing at least either one of relative positions of the plurality of said image pickup elements and a position of said changeover optical means, thereby changing a signal processing method depending upon the positions of the images.

Another aspect of the invention is the image pickup apparatus which has displacement detecting means for detecting displacements of images formed on pickup surfaces of said image pickup elements, and control means for controlling at least either one of positions of said image pickup elements and a position of said changeover optical means, based on an output from said displacement detecting means.

Another aspect of the invention is the image pickup apparatus which is arranged to simultaneously perform correction of changes of optical axes and optical pathlengths caused by the changeover between said first means and said second means and control of an angle on the object side between two beams captured through two said lenses.

Another aspect of the invention is the image pickup apparatus wherein said first means is a space.

Another aspect of the invention is the image pickup apparatus wherein said first means is a combination of two prism type total reflection mirrors.

Another aspect of the invention is the image pickup apparatus wherein said first means is a flat plate type double-sided mirror.

Another aspect of the invention is the image pickup apparatus wherein said second means is a combination of two prism type half mirrors.

Another aspect of the invention is the image pickup apparatus wherein said second means is a flat plate half mirror.

Another aspect of the invention is the image pickup apparatus wherein the changeover between said first means and said second means is effected by controlling directions of polarization of the beams captured through said lenses.

Another aspect of the invention is the image pickup apparatus wherein the beams incident through said lenses are guided independently of each other to the plurality of said image pickup elements corresponding thereto through a common lens system to the plurality of said lenses.

According to the invention of the one aspect, the stereoscopic image and the high-definition plane image can be obtained by changeover between the first means and the second means. In addition, the apparatus does not need accurate control of the vergence angle and high-accuracy drive of lenses in order to obtain the plane image, and the apparatus can be constructed of simple circuits without having to use the complex correlation arithmetic unit and image synthesizing circuit with large dissipation power. Further, because the signal processing is fundamentally free of the influence due to production dispersion of lenses and a difference in aberration characteristics of lenses in photography of plane image, the high-definition plane image can be always obtained anywhere on the screen.

Accordingly, the compact, light, and cheap image pickup apparatus can perform both stereoscopic photography and plane photography with very good quality by itself.

According to the invention of another aspect, a point of the object forms images on the respective color filters of the image pickup elements, and thus, by changing the pixel pitch of displacement, the degree of high definition can be controlled and the dynamic range of video signals can be enlarged.

According to the invention of another aspect, sharper video signals can be obtained based on output signals from the respective image pickup elements by simultaneously driving the image pickup elements by same clock with the images formed on the color filters as described above.

According to the invention of another aspect, use of the two lenses and two image pickup elements permits the apparatus to obtain the stereoscopic image based on the left and right video signals and to obtain the high-definition plane image.

According to the invention of another aspect, the compact changeover optical element can be used, thereby achieving the compact and cheap image pickup apparatus.

According to the invention of another aspect, the optical low-pass filters with optimum characteristics can be used for processing of image signals.

According to the invention of another aspect, a natural stereoscopic image can be obtained by changing the angle viewing the object.

According to the invention of another aspect, there is no need to have a mechanical mechanism for changing the viewing angle to the object, whereby the whole apparatus can be formed at low cost and in a compact size.

According to the invention of another aspect, the image pickup elements do not have to include more pixels than those corresponding to the standard signals.

According to the invention of another aspect, there is no need to adjust the positions of the lenses or image pickup elements in changeover between the first means and the second means, thus achieving the compact and cheap image pickup apparatus.

According to the invention of another aspect, there is no need to produce a precise changeover optical element, and the cheap changeover optical element can be used, thus achieving the cheap image pickup apparatus.

According to the invention of another aspect, unnecessary rays can be prevented from affecting an output image when the second means functions, and thus, an image with higher quality can be achieved.

According to the invention of another aspect, when the outputs from the image pickup elements are position-reversed, the original images can be restored, whereby the normal images can be always attained without outputting the position-reversed images.

According to the invention of another aspect, the relative positional relation between the images formed on the pickup surfaces of the image pickup elements can be kept in a predetermined positional relation.

According to the invention of another aspect, the signal processing method in functioning the second means can be properly changed depending upon the positions of the images, so that the user can choose one of some types of high-quality processes.

According to the invention of another aspect, the positions of the images can be controlled with accuracy.

According to the invention of another aspect, the apparatus can use the common drive mechanism for correcting the changes of the optical axes and optical pathlengths and for controlling the angle on the object side between the two beams captured through the two lenses, thereby achieving the cheap and compact image pickup apparatus.

According to the invention of another aspect, the cost of the changeover optical element can be decreased.

According to the invention of another aspect, there is no need to reverse the outputs from the image pickup elements in position, and the cost can be decreased.

According to the invention of another aspect, the deviation becomes little of the optical pathlengths and optical axes between reflected light and transmitted light, and a higher-definition plane image can be obtained.

According to the invention of another aspect, the cost can be decreased because of use of the cheap flat-plate half mirror.

According to the invention of another aspect, the directions of polarization of the beams can be quickly controlled, for example, through a liquid crystal panel or the like and the changeover between the first means and the second means can be performed at high speed and with high reliability without using a mechanical means.

According to the invention of another aspect, the same photographing conditions are achieved for a plurality of images because of passage of the beams through the common lens system, whereby a more stereoscopic or higher-definition image can be obtained.

Other objects and advantages of the present invention will become apparent from the detailed description to follow taken in conjunction with the appended claims.

DETAILED DESCRIPTION OF THE PREFERRED EMBODIMENTS

Figure 1:
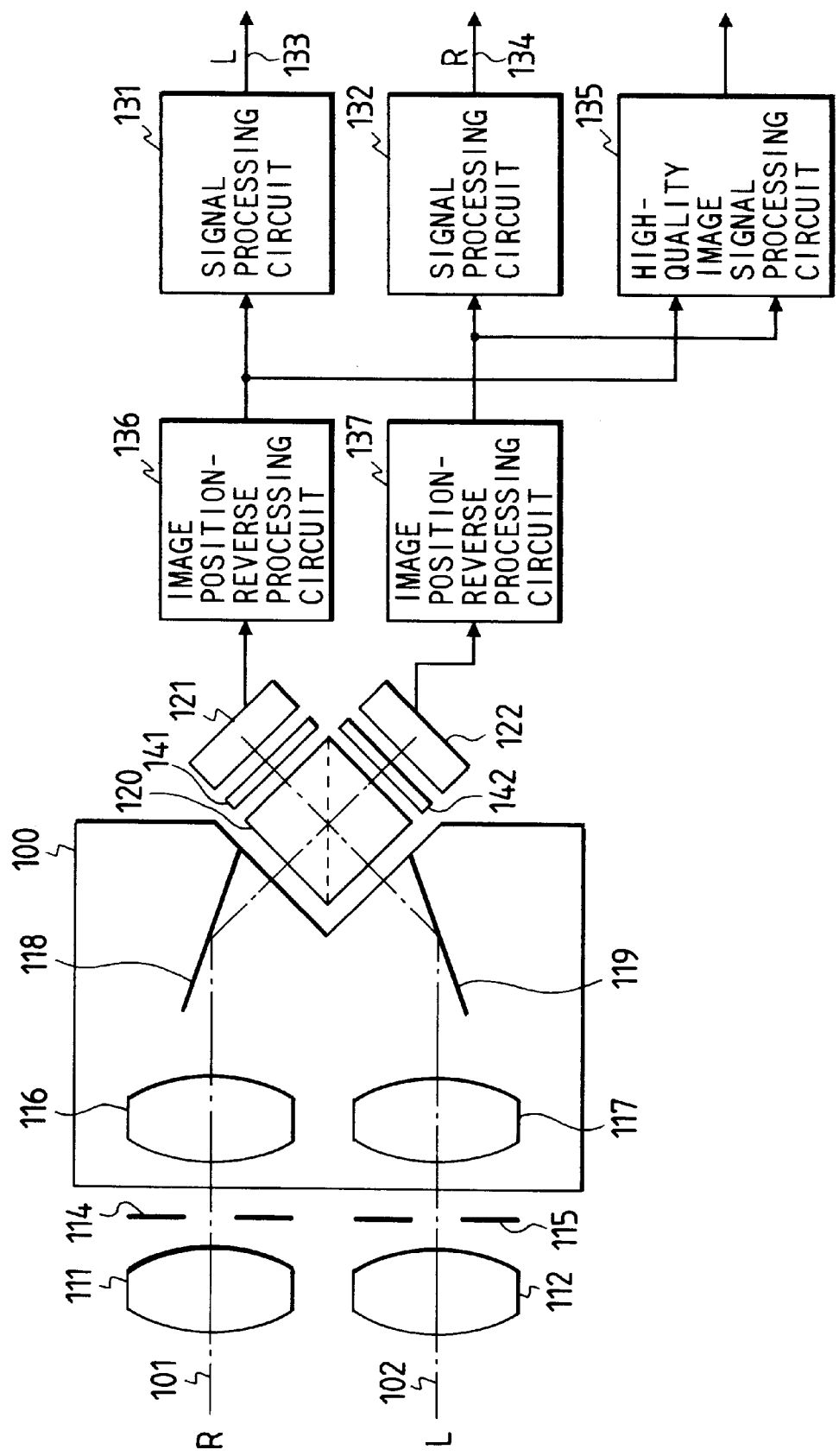
FIG. 1 is a schematic, structural drawing of the image pickup apparatus of the first embodiment according to the present invention.

The present invention will be described with respect to the embodiments thereof, referring to the drawings FIG. 1 is a schematic, structural drawing to show the image pickup apparatus of the first embodiment according to the present invention, which shows a layout of the optical system and a block diagram of signal processing circuits.

In FIG. 1, a beam 101 incident through a right (R) objective lens 111 is supplied via a stop 114 to an optical unit 100. Another beam 102 incident through a left (L) objective lens 112 is supplied via a stop 115 to the optical unit 100. In the optical unit 100 there are second group lenses 116, 117 and total reflection mirrors 118, 119, so that the beam 101 travels through the second group lens 116 to be reflected by the total reflection mirror 118 and the beam 102 travels through the second group lens 117 to be reflected by the total reflection mirror 119. The light beams reflected by the total reflection mirrors 118, 119 are guided so as to cross each other and then enter a changeover optical unit 120 disposed approximately at the position where the two beams cross each other. This arrangement of the changeover optical unit 120 at the intersecting position of the two beams permits the changeover optical unit 120, and in turn in turn the whole image pickup apparatus, to be compact and cheap. Numerals 141, 142 denote optical low-pass filters as described below.

Figure 2:
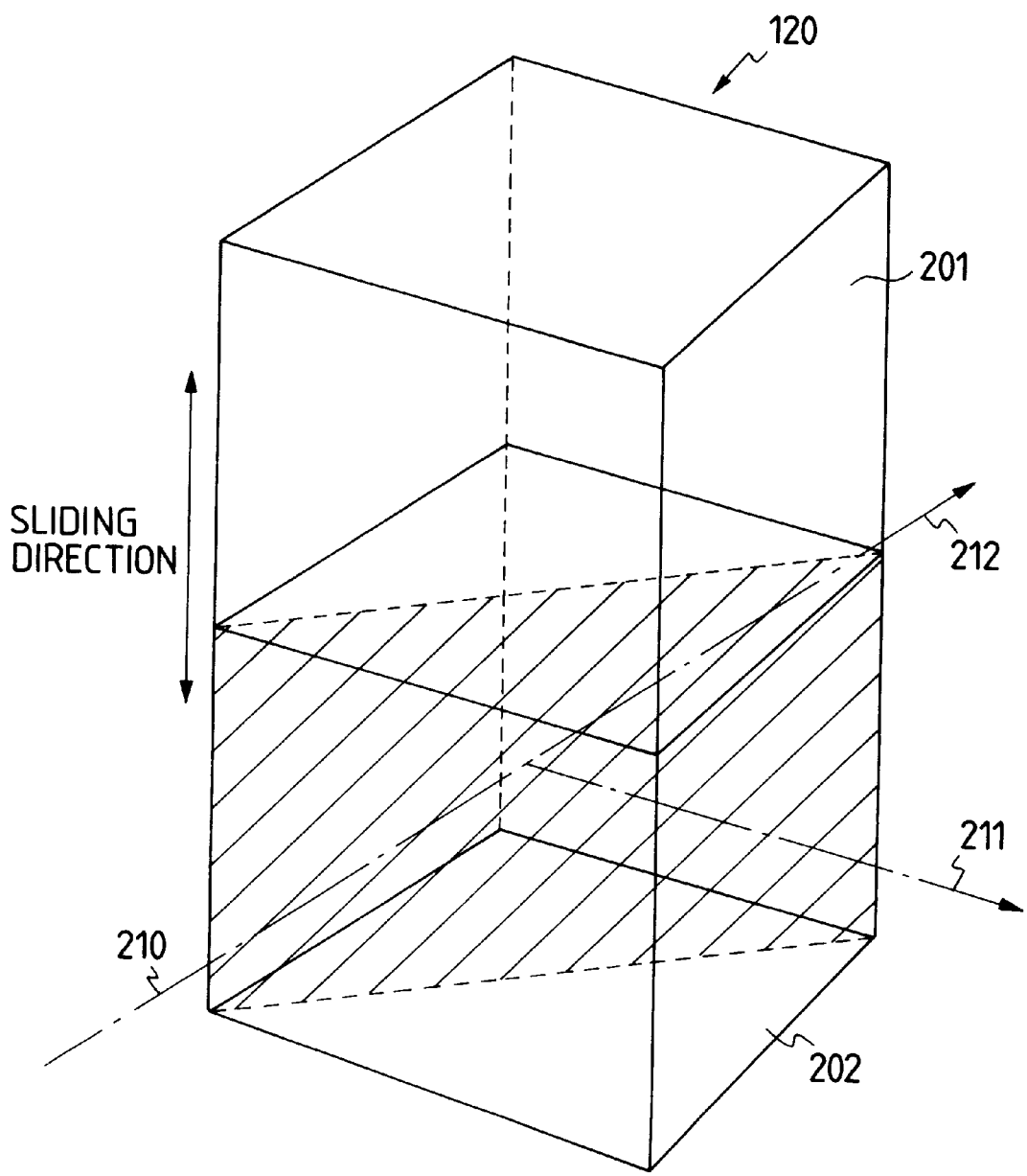
FIG. 2 is a perspective view to show the details of a changeover optical unit used in the first embodiment of the present invention.

FIG. 2 is a perspective view to show the details of the changeover optical unit 120. The changeover optical unit 120 has an upper through glass portion 201 of a glass cube for simply transmitting a beam and a lower beam splitter 202 composed of two prism type half mirrors combined with each other. A beam incident into the beam splitter 202 of the changeover optical unit 120 is evenly split for example into two beams 211, 212. The changeover optical unit 120 is mounted to the optical unit 100 so as to be slidable in the vertical direction (or in the direction normal to the plane of FIG. 1), and is arranged to be changed over between splitting and transmission of beam 210 by vertically sliding it. In the following description, a case in which the beam is incident into the through glass portion 201 will be referred to as a "stereoscopic photographing mode" and a case wherein the beam is incident into the beam splitter 202 will be referred to as a "high-definition photographing mode." When the prism type half mirrors are used as in the present embodiment, deviation becomes small in the optical axes of reflected light and transmitted light and in optical pathlengths thereof, enabling a higher-definition image.

The through glass portion 201 and beam splitter 202 are designed so as not to change the optical axes and optical pathlengths upon changeover between the above two photographing modes, that is, so as to keep the optical axes of the through glass portion 201 and beam splitter 202 coincident with each other and the optical pathlengths thereof equal to each other, for example by making them of respective materials having a same refractive index. This design requires no change in positional relations of the objective lenses 111, 112 and CCDs 121, 122 as solid state imagers upon changeover between the photographing modes, thus achieving the compact and cheap image pickup apparatus.

If the optical axes and optical pathlengths change because of changeover between the through glass portion 201 and the beam splitter 202, the apparatus may be modified so that the optical axes and optical pathlengths can be corrected by position adjustment of at least either the objective lenses 111, 112 and CCDs 121, 122 or the changeover optical unit 120. This arrangement may obviate a need to produce the changeover optical unit 120 with precision, and decrease the cost of the changeover optical unit 120, and in turn, the cost of the whole image pickup apparatus.

Figure 5:
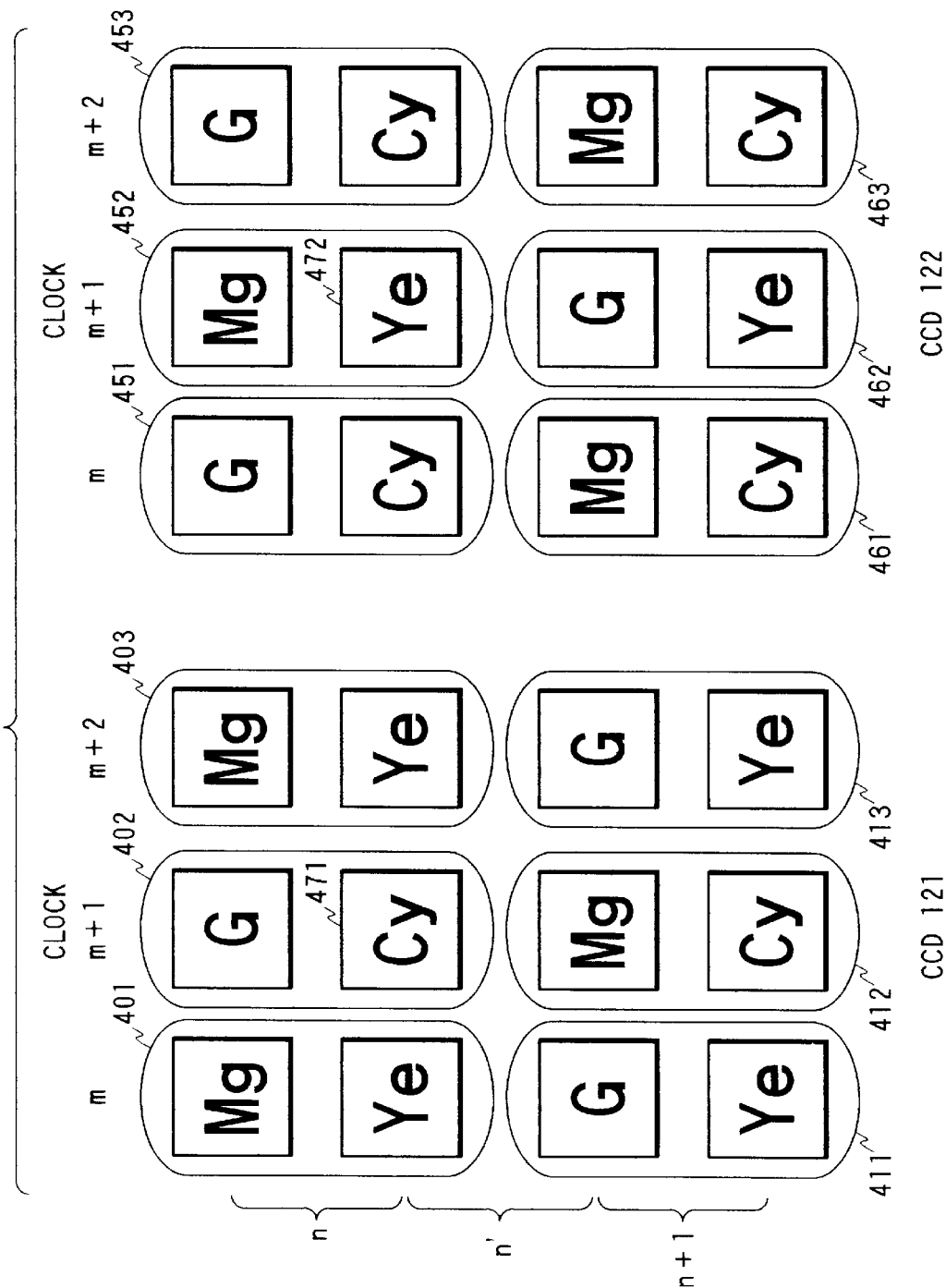
FIG. 5 is a drawing to show a positional relation between two CCDs used in the first embodiment of the present invention.

Next, the operation in the stereoscopic photographing mode and circuit blocks of signal processing will be explained with reference to FIG. 1. The beams 101, 102 traveling through the changeover optical unit 120 as crossing each other advance through optical low-pass filters 141, 142 to reach the CCDs 122, 121, respectively, as image pickup devices, then form respective images on pickup surfaces of these CCDs 122, 121. Then the CCD 121 outputs a signal corresponding to the image taken through the objective 112 and the CCD 122 outputs a signal corresponding to the image taken through the objective 111. Each CCD 122, 121 is a device with a color filter having an array of color filter elements arranged in the color difference line sequential system capable of obtaining relatively high resolving power as shown in FIG. 5, detailed later, and the single device can acquire a color image.

The output signals from the CCDs 121, 122 are input into image position-reverse processing circuits 136, 137, respectively. The image position-reverse processing circuit 136, 137 is a circuit for performing horizontal reverse processing of an image signal in order to restore the normal image from the position-reversed image at the total reflection mirror 118, 119 and output the normal image. The output from the image position-reverse processing circuit 136 or 137 is input into a video signal processing circuit 131 or 132, respectively, for signal-processing the CCD output signal. These video signal processing circuits 131, 132 generate and output standard video signals 133, 134, for example, in the NTSC method or the like. The standard video signals 133, 134 each can be displayed on a normal television receiver. Since the beams 101 and 102 are separated some distance from each other, which is similar to the state of human eyes, a stereoscopic feeling can be achieved when the standard video signals 133, 134 are input into a stereoscopic television and observed. Description will be given later as to a high-quality video signal processing circuit 135 to which the outputs from the image position-reverse processing circuits 136, 137 are supplied.

Figure 4:
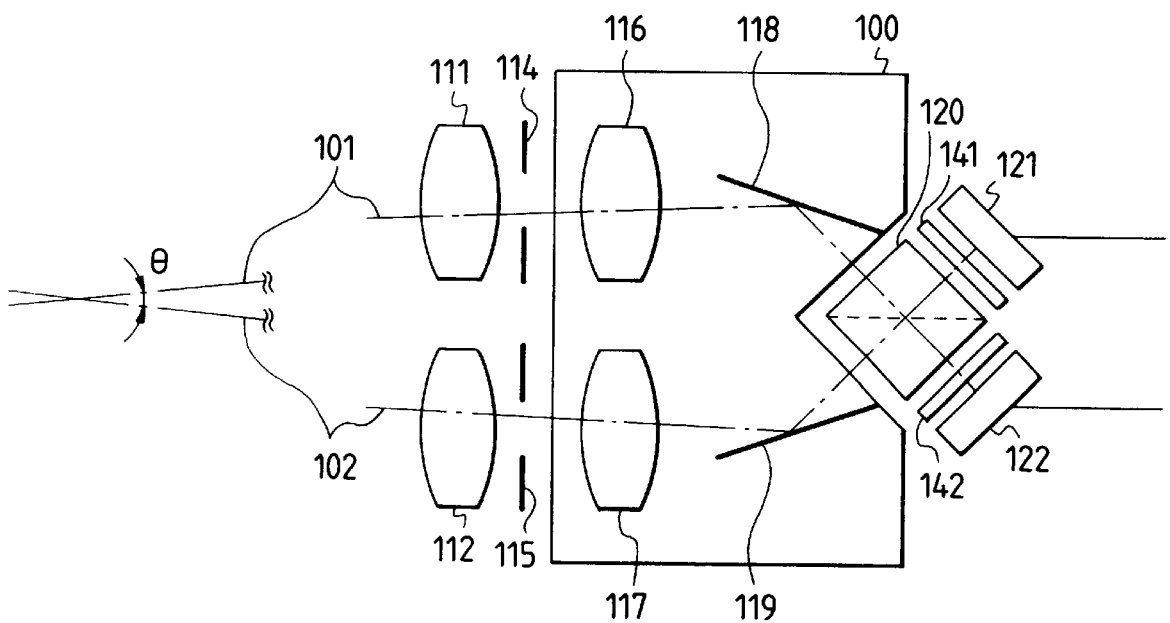
FIG. 4 is a drawing to illustrate an angle of vergence θ in the image pickup apparatus of FIG. 1.

It is generally known that a more natural stereoscopic image can be attained when images picked up in stereoscopic photography are taken with an angle between the optical axes of the two lenses, that is, with an angle of vergence. Thus, another apparatus may be constructed in such an arrangement, as shown in FIG. 4, that the beams 101, 102 are preliminarily set to have an angle θ converged inward toward the object. The image pickup apparatus set in this manner has the photographing condition similar to that when a man looks at an object, so that it can obtain a high-quality stereoscopic image without a sense of incompatibility.

Figure 3:
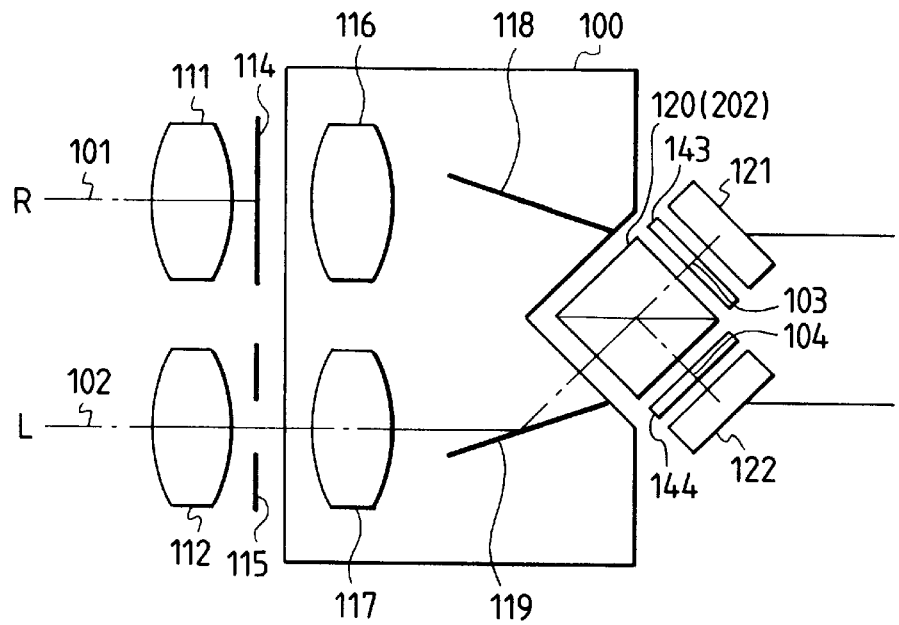
FIG. 3 is a drawing to illustrate the operation in a high-definition pickup mode of the image pickup apparatus of FIG. 1.

Next, the operation in the high-definition photographing mode will be explained. In the high-definition photographing mode, as shown in FIG. 3, the stop 115 is effective, but the stop 114 is completely closed in order to prevent the beam 101 from mixing into the next optical unit 100, thereby preventing degradation of picture quality from occurring due to a hindrance of flare or the like. Namely, only one lens system is used in the high-definition photographing mode. As a result, the beam 102 taken through the objective lens 112 travels via the stop 115, second group lens 117, and total reflection mirror 119 to enter the beam splitter 202 of the changeover optical unit 120. Then the beam splitter 202 splits the beam 102 into two beams 103, 104 in even light quantities, which form images on the pickup surfaces of CCDs 121, 122 through optical low-pass filters 143, 144 having different characteristics from those of the optical low-pass filters 141, 142 used in the stereoscopic photographing mode as described above It is a matter of course that the apparatus may be arranged in such a manner that the stop 114 is opened, while the stop 115 is closed to use the beam 101 from the objective 111.

FIG. 5 shows a positional relation between the CCDs 121, 122. FIG. 5 shows that images of a point of the object are formed at positions shifted by one pixel pitch in the horizontal direction from each other on the two CCDs 121, 122. Namely, supposing the optical-axis center of the beam 103 separated by the changeover optical unit 120 is focused on pixel 471 of a cyan (Cy) filter, the optical-axis center of the beam 104 will be focused on a pixel 472 of a yellow (Ye) filter a pitch next.

In the high-definition photographing mode, the beam 102 is split into the two beams 103, 104 to form the respective images on the two CCDs 121, 122, thereby obtaining two electronic video signals. The high-quality video signal processing circuit 135 shown in FIG. 1 is a circuit for synthesizing the two video signals obtained in this high-definition photographing mode. Next explained is signal processing in this high-quality video signal processing circuit 135.

The CCDs 121, 122 perform two line pixel simultaneous readout in the same manner as a normal one-chip color camera does. In more detail, as shown in FIG. 5, the n-th lines in the even field are read out as follows.

|  | CCD 121 | CCD 122 |
| --- | --- | --- |
| m-th clock | (Mg + Ye) | (G + Cy) |
| (m + 1)th clock | (G + Cy) | (Mg + Ye) |
| (m + 2)th clock | (Mg + Ye) | (G + Cy) |
| . | . | . |
| . | . | . |
| . | . | . |

Further, in the odd field, a line shifted below, the n'-th lines are read out as follows.

|         | CCD 121   | CCD 122   |
| --- | --- | --- |
| m-th clock | (Ye + G) | (Cy + Mg) |
| (m + 1)th clock | (Cy + Mg) | (Ye + G) |
| (m + 2)th clock | (Ye + G) | (Cy + Mg) |
| . | . | . |
| . | . | . |
| . | . | . |

For simplifying the following explanation, let us assume here Ye=R (red)+G (green), Mg (magenta)=R+B (blue), and Cy=B+G. Generally, the luminance signal Y is given as a sum of four color signals as follows.

$$Y=(Ye+Mg+Cy+G)$$

Thus, the apparatus of the present embodiment can obtain information of four pixels corresponding to the four color signals at a same clock, as described above, and a luminance signal is obtained by simply adding the outputs from the two CCDs 121, 122. This permits the apparatus of the present embodiment to obtain sharper video signals because of no need of horizontal, electronic low-pass filtering, as compared with the luminance signal processing arranged to obtain the luminance signal Y by mixture with adjacent pixels utilizing horizontal, electronic low-pass filters as in the conventional one-chip color camera.

Conventionally, RGB color signals were generally obtained by synthesizing signals in an RGB matrix circuit, based on timing adjustment to simultaneously obtain signals at four clocks of neighboring pixels (Mg+Ye), (G+Cy), (Ye+G), and (Cy+Mg). The apparatus of the present embodiment, however, uses the associated signals from the CCDs 121, 122, instead of the adjacent pixel signals, to perform the color signal processing. For example, the R signals can be obtained by the following processing, as shown in FIG. 5.

|         | (Mg + Ye) | (G + Cy) |
| --- | --- | --- |
| m-th clock | R = signal 401 − | α × signal 451 |
| (m + 1)th clock | R = signal 452 − | α × signal 402 |
| (m + 2)th clock | R = signal 403 − | α × signal 453 |
| . | . | . |
| . | . | . |
| . | . | . |

Further, the B signals can be obtained by the following processing, as shown in FIG. 5.

|         | (Mg + Cy) | (G + Ye) |
| --- | --- | --- |
| m-th clock | B = signal 461 − | β × signal 411 |
| (m + 1)th clock | B = signal 412 − | β × signal 462 |
| (m + 2)th clock | B = signal 463 − | β × signal 413 |
| . | . | . |
| . | . | . |
| . | . | . |

Moreover, the G signals can be obtained by the following.

$$G=Y-R-B$$

As explained, the present apparatus can obtain the luminance signal Y and RGB color signals by driving the two CCDs 121, 122 at simultaneous clocks without using adjacent pixels and processing the output signals therefrom in the above manner, so that no color moire will appear even with an object having chromatic colors and fine patterns. Hence, the present apparatus can obtain high-definition pictures with very excellent picture quality, as compared with the conventional one-chip color cameras. Since the present apparatus is free of the disturbance due to color moiré, it can obtain adequately excellent image characteristics even though the processing of luminance signal is fundamental processing, and the apparatus can use the optical low-pass filters having high cut-off frequencies.

The processing for obtaining such high-definition images is not limited to the above. For example, there is a method for setting the two CCDs 121, 122 in a positional relation of half-pitch deviation of pixels in the same manner as the conventional method and setting intervals of pixel sampling to the half of those in the conventional case. In this case, the pixel clock frequency is doubled, which permits more accurate filtering, thereby enabling to obtain ideal characteristics up to the resolution limit that can be achieved by optical lenses or up to the cut-off frequency limit of the optical low-pass filters. Further, by selecting the same colors for the color filters of the both CCDs 121, 122 and synthesizing the signals therefrom at an adequate mixture ratio, video signals with a wide dynamic range can be obtained.

Further, the image pickup apparatus of the present embodiment permits a user to select one of several types of high-quality processes, because the apparatus is arranged in such a manner that the positions of the images focused on the pickup surfaces of the CCDs 121, 122 can be changed by at least either changing the relative positions between the CCDs 121, 122 or changing the position of the changeover optical unit 120 as described below with FIG. 10, and the signal processing method can be changed depending upon the positions of the images. The colors and array of the color filters are not limited to those of the complement line sequential system, but high-quality images can be obtained similarly by the primary color stripe system, the primary color Bayer array system, and so on.

There are some cases where the characteristics of the optical low-pass filters optimal to the respective processes are different between in the stereoscopic photographing mode and in the high-definition photographing mode. The present apparatus is thus arranged to change the optical low-pass filters 141, 142 in the stereoscopic photographing mode into the optical low-pass filters 143, 144 in the high-definition photographing mode, depending upon the processing method of the high-quality processing in the stereoscopic photographing mode and in the high-definition photographing mode. This permits the apparatus to use the optical low-pass filters with optimum characteristics in each mode, thereby further improving the picture quality. The present apparatus is arranged in such a manner that the optical low-pass filters 141 to 144 are incorporated with the changeover optical unit 120 and changeover is effected between the optical low-pass filters 141, 142 and the optical low-pass filters 143, 144 at the same time as the changeover optical unit 120 is vertically moved.

Since in the high-definition photographing mode of FIG. 3 the beam 104 is reflected twice by the total reflection mirror 119 and beam splitter 202, the image is normal as a result without reverse in position, and it is not necessary to reverse the image read-out direction of CCD 122, as it was in the stereoscopic photographing mode.

As described above, the image pickup apparatus of the present embodiment is a single camera that can serve both as a multi-eye stereoscopic camera and a high-definition plane image camera by changeover between the through glass portion 201 and the beam splitter 202 of the changeover optical unit 120. In addition, the apparatus does not need accurate control of the vergence angle or high-accuracy drive of the optical lenses in order to obtain the high-definition plane image, as required in the conventional apparatus, and further, the apparatus needs neither complex correlation arithmetic unit nor image synthesizing circuit of large dissipation power. The apparatus can be constructed of simple circuits accordingly. Further, in the high-definition mode, the signal processing is fundamentally free of the influence due to the production dispersion and the difference in aberration characteristics of the two objective lenses 111, 112, so that a high-definition plane image can be always obtained anywhere on the screen.

Next, the second to fifth embodiments of the present invention will be explained, which are characterized in that a more natural stereoscopic image can be obtained by controlling the vergence angle, which is an angle on the object side between the two beams taken through the two objective lenses 111, 112.

First, the second embodiment of the present invention is explained with reference to the drawings.

Figure 6A:
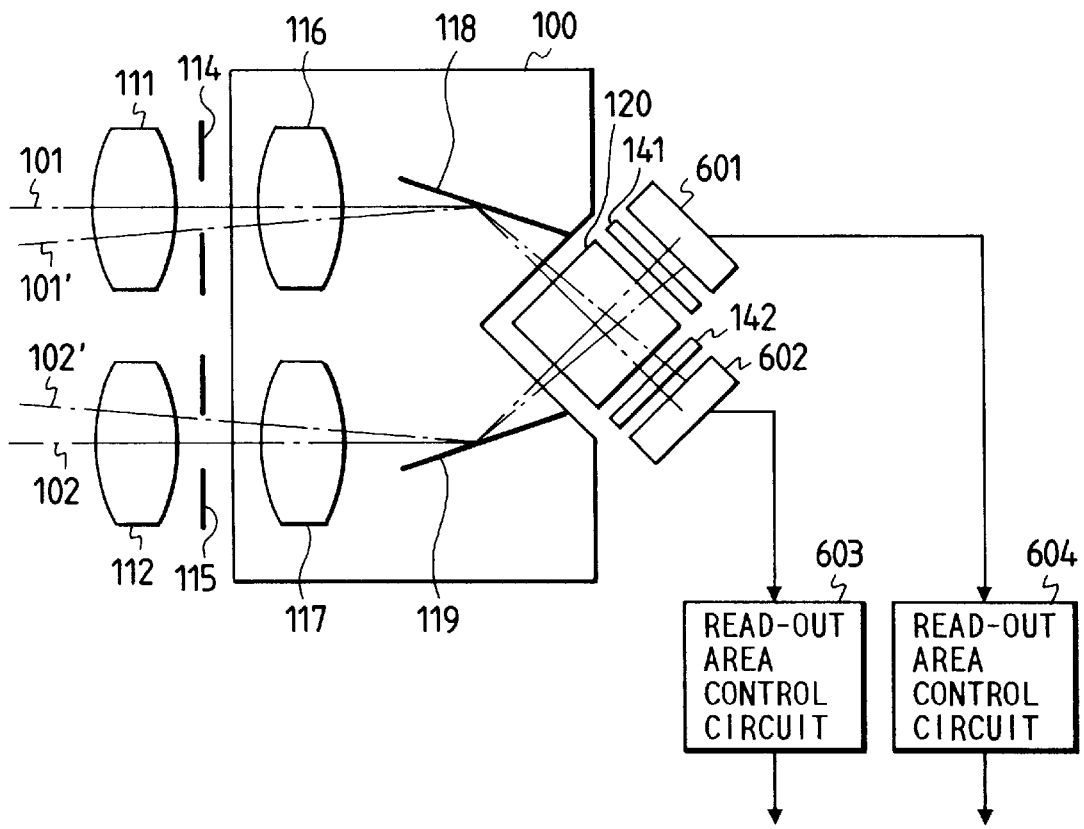
FIGS. 6A and 6B are drawings to illustrate the image pickup apparatus of the second embodiment according to the present invention.
Figure 6B:
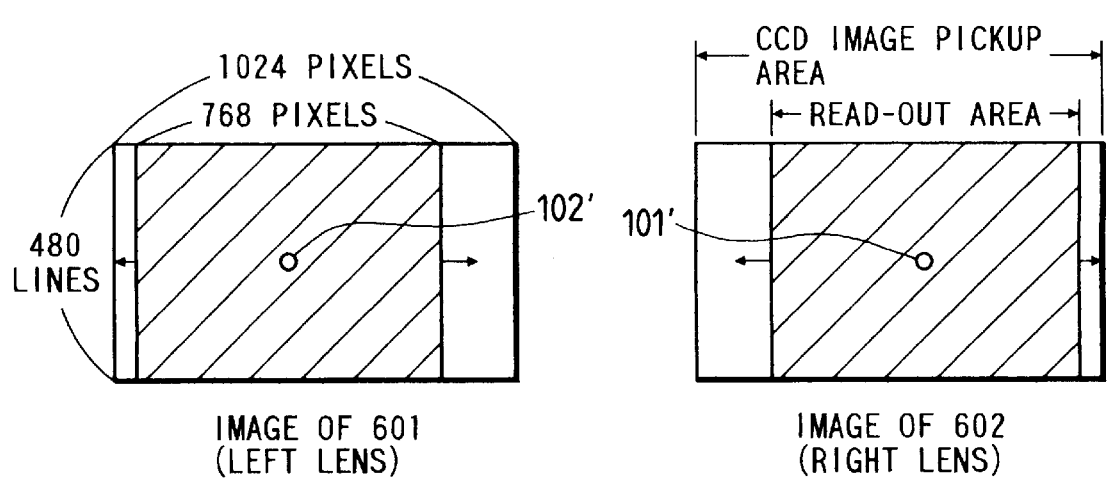

FIG. 6A shows the configuration of the image pickup apparatus of the second embodiment In FIG. 6A, similar members to those in the first embodiment will be denoted by the same reference numerals, and explanation thereof will be omitted. The CCDs 601, 602 are those having more pixels (for example, 1024×480 pixels for wide vision) than pixels corresponding to the standard video signals (768×480 pixels) in the case of the NTSC method). A read-out area control circuit 603, 604, to which the output from the CCD 601, 602 is supplied, outputs a part (for example, 768×480 pixels) of the image pickup area of CCD 601, 602, as shown in FIG. 6B, as an actual video signal to the image position-reverse processing circuit 136, 137, respectively, of FIG. 1 in the stereoscopic photographing mode. The read-out areas are shifted left or right as indicated by the arrows in FIG. 6B, depending upon the object distance, to adjust an angle of view, thus equivalently controlling the angle of vergence made between the beam 101' and the beam 102'. This method can achieve a further more natural stereoscopic image by equivalently changing the vergence angle depending upon the object distance than the first embodiment can, and because the method needs no mechanical mechanism for controlling the vergence angle, the whole apparatus can be constructed at low cost and in a compact structure. The configuration of the present embodiment may be applied to the high-definition photographing mode. In that case, the apparatus is arranged to control an angle on the object side of the image pickup apparatus between two rays passing the centers of the two images finally obtained.

The third and fourth embodiments of the present invention are next explained referring to the drawings.

Figure 7:
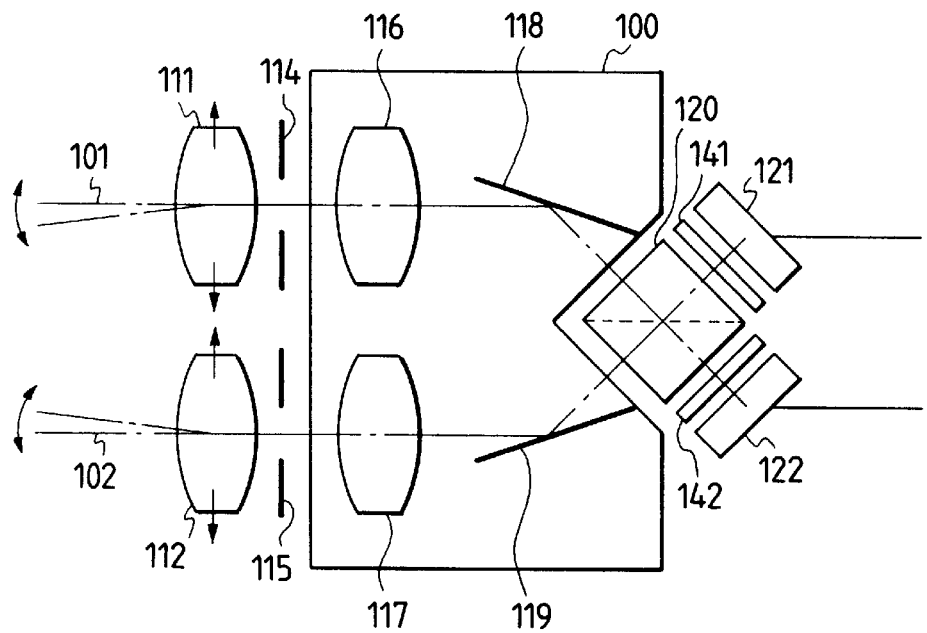
FIG. 7 is a drawing to illustrate the image pickup apparatus of the third embodiment according to the present invention.
Figure 8:
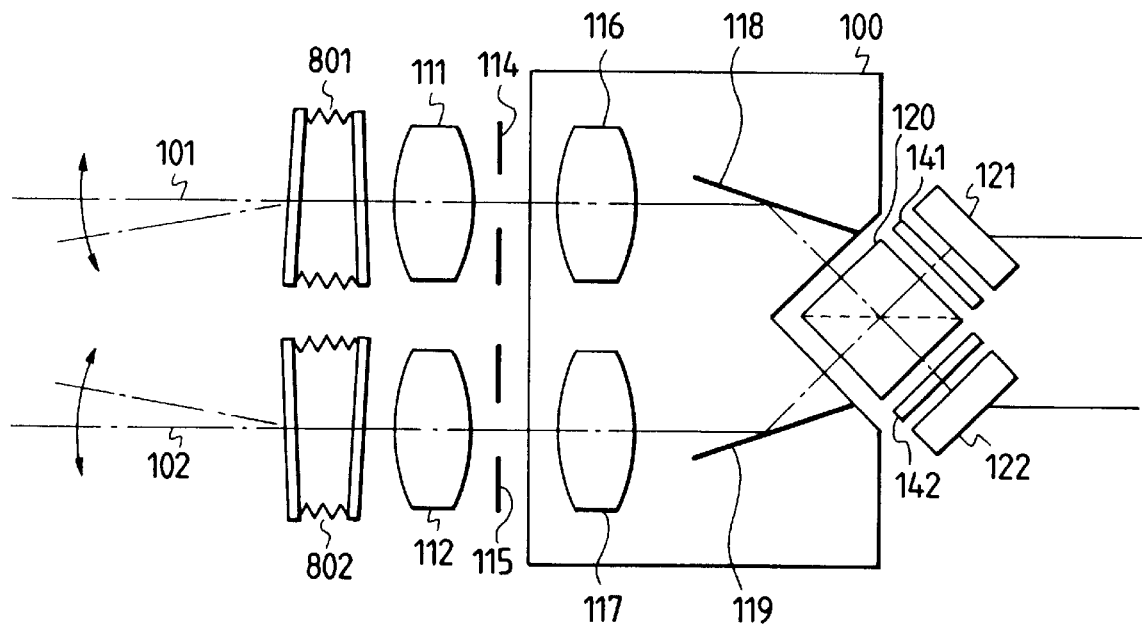
FIG. 8 is a drawing to illustrate the image pickup apparatus of the fourth embodiment according to the present invention.

The third embodiment is arranged, as shown in FIG. 7, to shift the objective lenses 111, 112 in the arrow directions normal to the optical axes 101, 102 in the stereoscopic photographing mode so as to bend the optical axes, thereby actually changing the angle of vergence. The fourth embodiment is arranged, as shown in FIG. 8, to have variable apical-angle prisms 801, 802 before the objective lenses 111, 112, whereby the apical angles of the prisms 801, 802 are changed in the stereoscopic photographing mode to bend the optical axes, thereby actually changing the angle of vergence. The third and fourth embodiments can attain a further more natural stereoscopic image by changing the vergence angle depending upon the object distance than the first embodiment can. These embodiments need a mechanical mechanism for driving the optical elements and possibly have chromatic aberration. However, the CCDs 121, 122 of these embodiments can be those with the normal number of pixels corresponding to the standard video signals and the area of image formed by the optical unit 100 may be set to be substantially equal to the area of CCD 121, 122, which makes the optical paths thinner and the optical unit 100 compact. The configurations of these embodiments may be applied to the high-definition photographing mode.

The fifth embodiment of the present invention is next explained with reference to the drawing.

Figure 9:
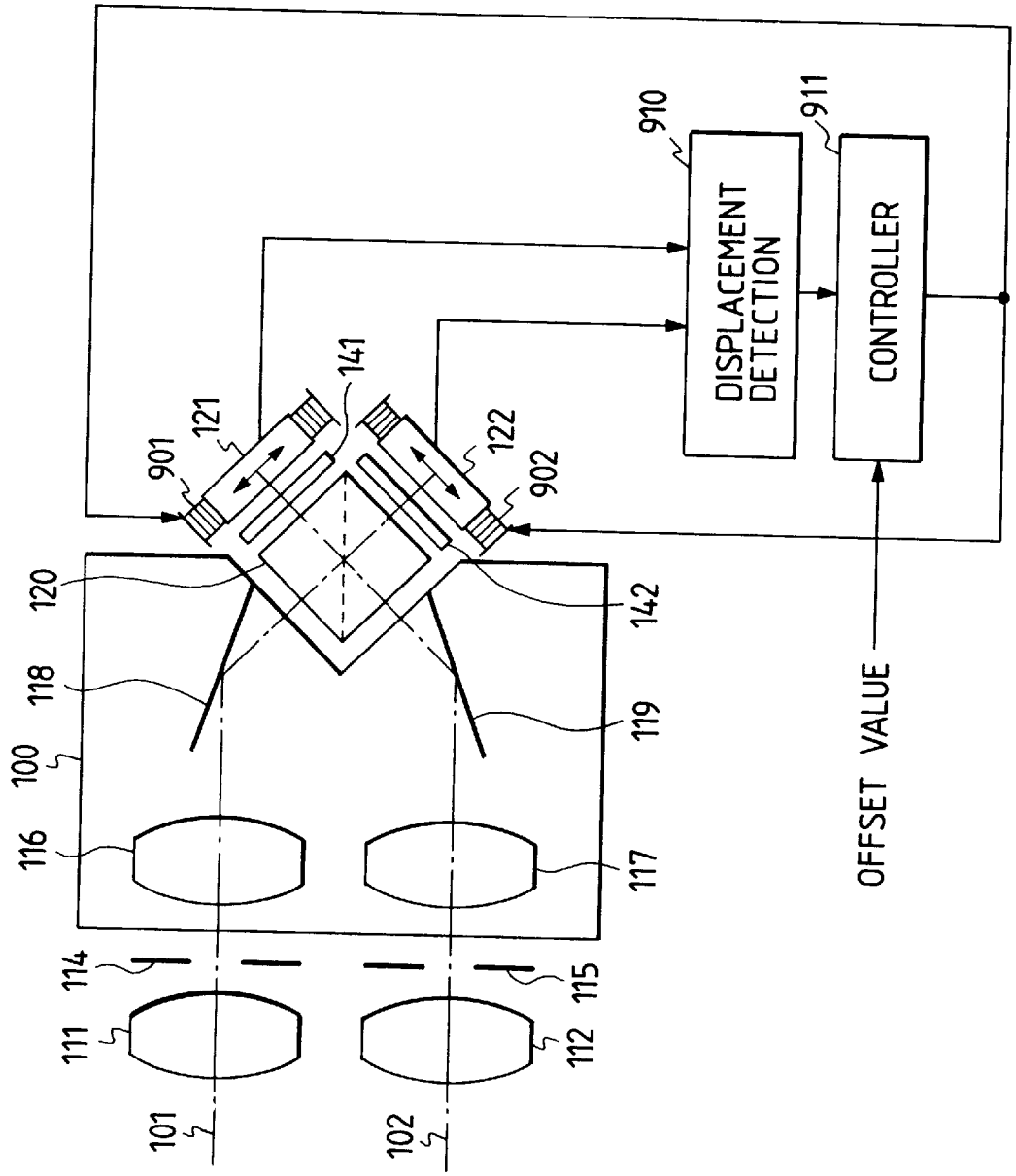
FIG. 9 is a drawing to illustrate the image pickup apparatus of the fifth embodiment according to the present invention.

In the present embodiment, as shown in FIG. 9, the CCDs 121, 122 are arranged to move in directions along the plane of FIG. 9 and perpendicular to the optical axes 101, 102, respectively An actuator 901, 902 mounted to the CCD 121, 122 moves the CCD 121, 122 in the directions along the arrows in FIG. 9, thereby shifting the screen in the horizontal direction As a result, the angle of view, i.e., the vergence angle can be adjusted in the stereoscopic photographing mode, based on the same principle as explained in FIGS. 6A and 6B. The mechanism for moving the CCDs 121, 122 can be simplified by using compact and high-accuracy lamination type piezoelectric devices for the actuators 901, 902, which results in simplifying the configuration of the whole apparatus. The configuration of the present embodiment may be applied to the high-definition photographing mode.

The present embodiment has a displacement detecting circuit 910 for receiving the output signals from the actuators 901, 902 and a controller 911 for receiving the output signal from the displacement detecting circuit 910. The displacement detecting circuit 910 electronically detects displacements of the images obtained by the CCDs 121, 122, and the controller 911 operates to correct the positions of the CCDs 121, 122, based on the detection values. Accordingly, the configuration of FIG. 9 can always keep the positional relation of the CCDs 121, 122 properly, thus achieving high-accuracy images. In contrast with it, the first to fourth embodiments need a lot of time for adjusting work of the positional relation between the CCDs 121, 122, carried out when produced, because each pixel in the CCDs 121, 122 is of a microscopic size as small as some $\mu$m. Further, the positional relation of FIG. 5 cannot be established even with a small displacement of the changeover optical unit 120, which lowers the picture quality on the contrary. The first to fourth embodiments may be thus arranged to have the displacement detecting circuit and controller as in the present embodiment. The controller 911 is formed to permit input of an offset value; "1" is input thereto for the relation of shift of a pixel as in FIG. 5; "0.5" is input thereto for the relation of shift of the half pitch as in the conventional cases; "0" is input thereto for enlargement of the dynamic range utilizing same color filters.

For example, the actuators 901, 902 may be arranged to simultaneously perform correction for changes of the optical axes and optical pathlengths caused by changeover between the through glass portion 201 and the beam splitter 202 as described above, and the control of the vergence angle. This arrangement permits the drive mechanism to be shared, which enables to obtain a cheap and compact image pickup apparatus. Instead of the actuators 901, 902, the correction for the changes of the optical axes and optical pathlengths and the control of vergence angle can be simultaneously carried out by movement or state change of the objective lenses 111, 112 or the same member such as the changeover optical unit 120.

In the present embodiment, the displacement detecting circuit 910 fundamentally just detects a displacement between the video signals obtained by the same pupils from the same object, and thus, sufficient accuracy can be achieved in a simple circuit configuration Since the configuration of FIG. 9 has the actuators 901, 902, displacement detecting circuit 910, and controller 911 as explained, it can employ low-cost image pickup devices and drive circuits popularly mass-produced and distributed as home-use camcorders. Further, the optimum pixel positional relation can be always maintained even with a displacement upon mounting of the changeover optical unit 120 or with a play upon changeover. In addition, it is possible to change the processing method of the high-definition photographing mode.

Next explained referring to the drawing is the sixth embodiment of the present invention in which the changeover optical unit 120 is arranged to correct and change the positional relation between the pixels in the CCDs 121, 122.

Figure 10:
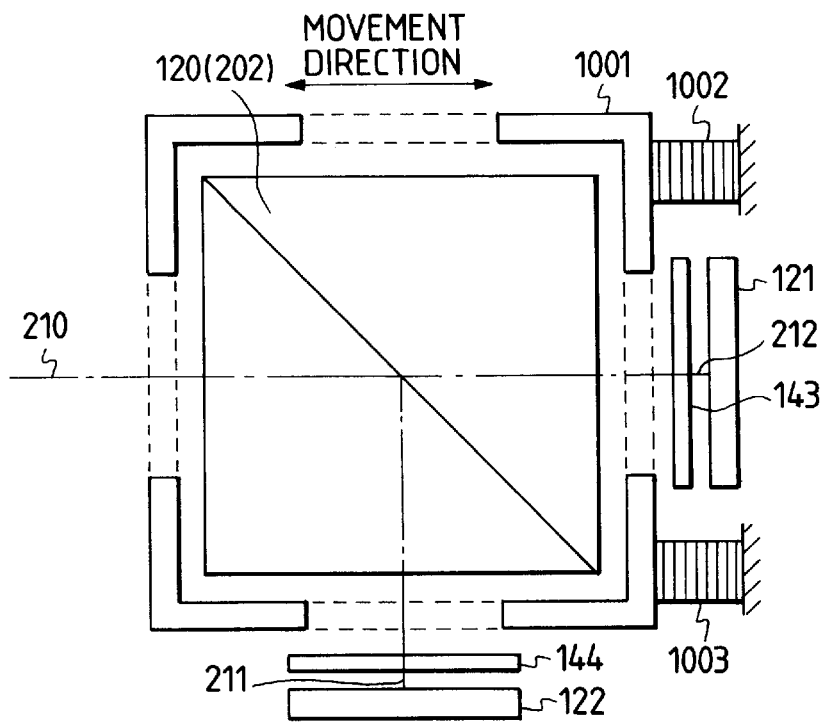
FIG. 10 is a drawing to illustrate the image pickup apparatus of the sixth embodiment according to the present invention.

In FIG. 10, the changeover optical unit 120 is supported by a guide mechanism 1001 so as to be movable in the vertical direction (i.e., in the direction normal to the plane of FIG. 10) and in the horizontal direction The guide mechanism 1001 is combined with actuators 1002, 1003 so as to be movable along the optical axis of the beam 210 in the horizontal direction. In the present embodiment the actuators 1002, 1003 are lamination type piezoelectric devices. When the actuators 1002, 1003 expand and contract in the high-definition photographing mode, the changeover optical unit 120 moves in the horizontal direction with movement of the guide mechanism 1001 along the horizontal direction, thereby translating one beam 211 out of two beams obtained when the beam 210 is split by the beam splitter 202. Since the other beam 211 is stationary this time out of the two beams obtained from the beam 210, only the image of CCD 122 moves in the horizontal direction of screen, whereby the positional relation between the pixels can be corrected and changed as a result. This method can achieve the same effect as explained in FIG. 9, and does not need to move the CCDs 121, 122, which have heat radiation, have a lot of conductor lines, and are electrically sensitive, thus decreasing the cost in mass production.

The image pickup apparatus of the present embodiment was arranged to change the position of the changeover optical unit 120, but the apparatus may be modified to change both the relative positions of the CCDs 121, 122 and the position of the changeover optical unit 120 so as to change the positions of the images formed on the pickup surfaces of CCDs 121, 122 and to change the signal processing method depending upon the positions of the images. This arrangement can also permit the user to select one out of some types of high-quality processes.

Next explained are the seventh to twelfth embodiments of the present invention featured in the configuration of the changeover optical unit. The seventh embodiment of the present invention is first explained referring to the drawing.

Figure 11:
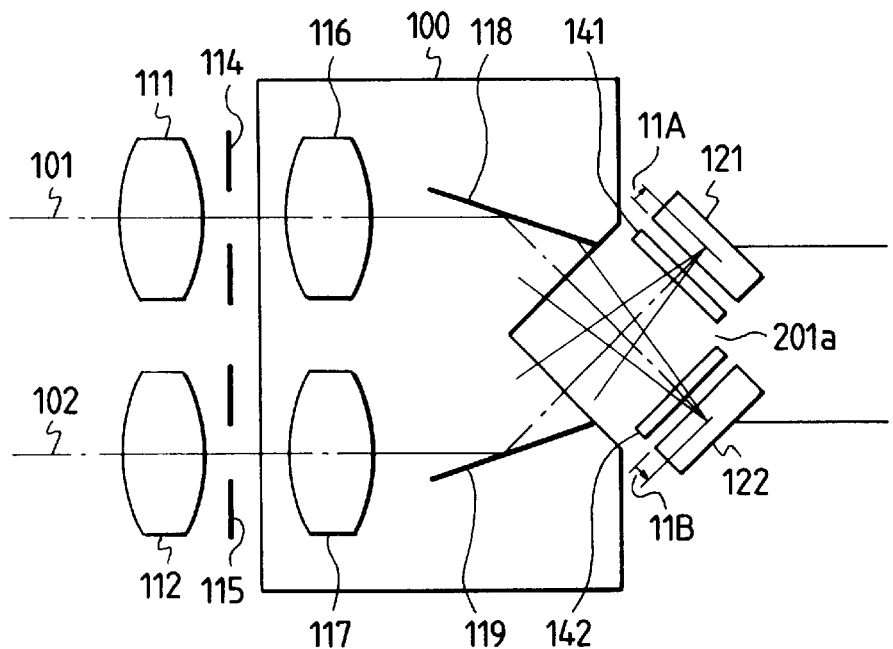
FIG. 11 is a drawing to illustrate the image pickup apparatus of the seventh embodiment according to the present invention.

FIG. 11 shows the schematic structure in the stereoscopic photographing mode of the image pickup apparatus of the seventh embodiment according to the present invention. The changeover optical unit 120 shown in FIG. 2 needs to have a function to split a beam and a function to transmit a plurality of beams independently of each other, but does not always have to set the optical pathlength of the through glass portion 201 to be equal to that of the beam splitter 202. The changeover optical unit of the present embodiment excludes the through glass portion 201, but has a space 201a in the portion of the through glass portion 201. In this case, the changeover optical unit actually includes only the beam splitter 202, and, therefore, the changeover optical unit may be arranged in such a manner that it is mounted in the high-definition photographing mode but is removed in the stereoscopic photographing mode. This apparatus is arranged to allow focus adjustment, and the objective lens 111, 112 or the second group lens 116, 117 moves along the direction of the optical axis 101, 102.

FIG. 11 is illustrated so that the positions of the CCDs 121, 122 and the positions of the objectives 111, 112 and second group lenses 116, 117 are optimal in the high-definition photographing mode. Since in the stereoscopic photographing mode simply the space 201a is located between the optical unit 100 and the CCDs 121, 122, the positions of focal points are shifted in the directions and by the lengths as represented by 11A, 11B, respectively. The present apparatus is thus arranged to perform readjustment by moving the objective lenses 111, 112 or the second group lenses 116, 117 so as to focus the beams on the image surfaces of the CCDs 121, 122. An amount of this adjustment is a length preliminarily obtained from the refractive index and the optical path of the changeover optical unit, which is stored, and correction is effected using the value stored upon changeover of photographing mode. Alternatively, utilizing the autofocusing function, autofocusing may be restarted upon changeover of photographing mode. In this case, because a drive direction of focusing lenses can be preliminarily predicted from the principle; specifically, the focal points move forward in a change of from the stereoscopic photographing mode to the high-definition photographing mode, but the focal points move backward in a change of from the high-definition photographing mode to the stereoscopic photographing mode, high-speed focusing can be achieved by driving the lenses in the either specified direction. Since the present embodiment utilizes the mechanism for focusing as it is, there is no increase in the cost for focus readjustment Further, the upper part of the changeover optical unit is not necessary, and, therefore, the cost of the changeover optical unit can be low.

The eighth embodiment of the present invention is next explained referring to the drawing.

Figure 12:
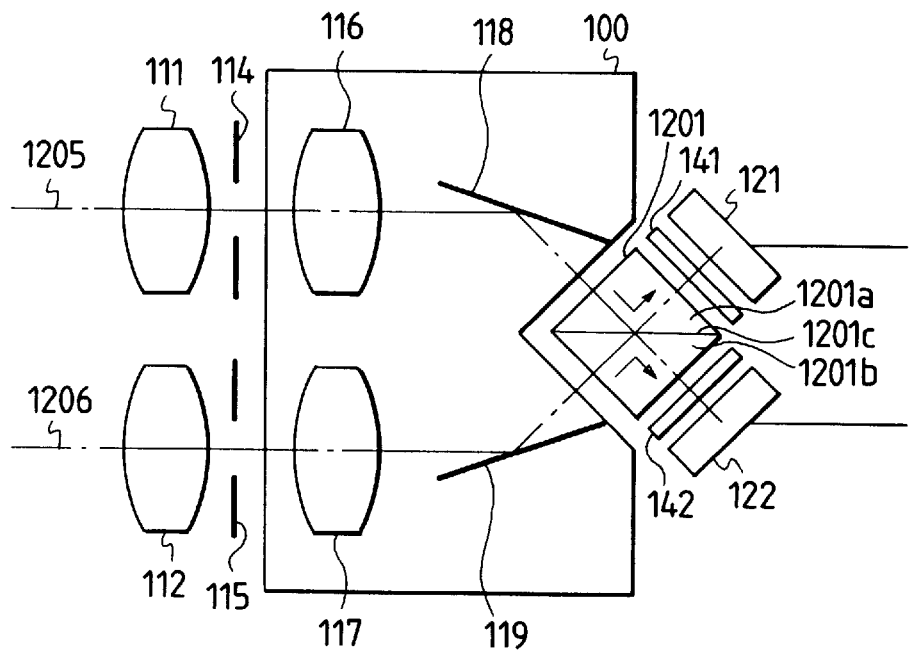
FIG. 12 is a drawing to illustrate the image pickup apparatus of the eighth embodiment according to the present invention.

FIG. 12 shows the operation in the stereoscopic photographing mode where the upper part of the changeover optical unit is replaced by a prism type total reflection mirror 1201, according to the present embodiment The prism type total reflection mirror 1201 is formed in such an arrangement that, for example, two upper and lower triangular prisms 1201a, 1201b are combined with each other as sandwiching a mirror coating surface 1201c. Two beams 1205, 1206 travel via the objective lenses 111, 112 and total reflection mirrors 118, 119 etc. to reach the prism type total reflection mirror 1201, and are reflected each by the mirror coating surface 1201c to form respective images on the pickup surfaces of the CCDs 121, 122. Since the beams 1205, 1206 are mirror-reflected twice in this apparatus, this apparatus does not need the reverse processing of pickup images.

The ninth embodiment of the present invention is next explained referring to the drawing.

Figure 13:
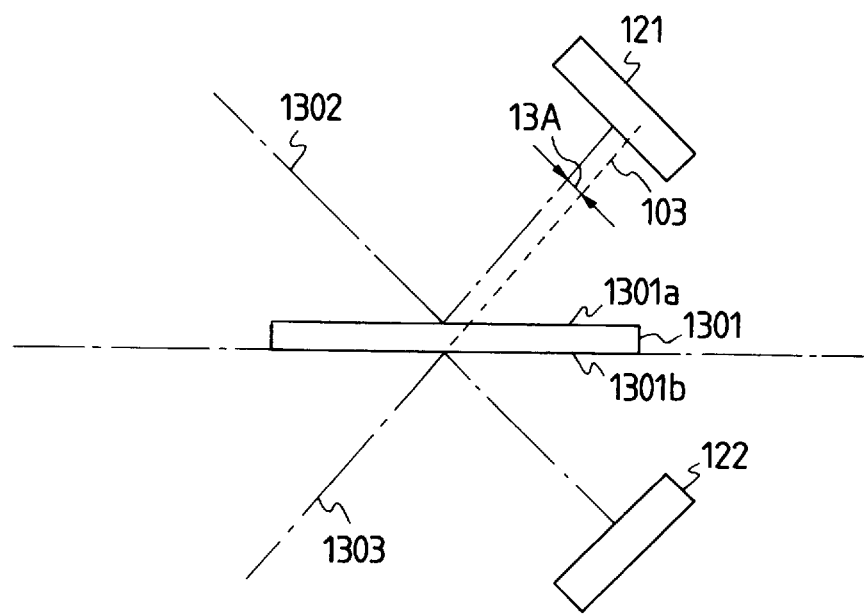
FIG. 13 is a drawing to illustrate the image pickup apparatus of the ninth embodiment according to the present invention.

FIG. 13 shows the operation in the stereoscopic photographing mode where the upper part of the changeover optical unit is replaced by a flat plate double-sided mirror 1301, according to the present embodiment. The optical low-pass filters 141, 142 are omitted to illustrate in FIG. 13. The double-sided mirror 1301 is a mirror formed by forming mirror coating surfaces 1301a, 1301b for total reflection on the both sides of a flat substrate, for example. A beam 1302 incident from the side of the objective 111 (see FIG. 12) and a beam 1303 incident from the side of the objective 112 (see FIG. 12) are totally reflected by the mirror coating surfaces 1301a, 1301b, respectively, of the double-sided mirror 1301 to form respective images on the CCDs 121, 122, respectively. This embodiment does not need the position-reverse processing of the pickup images as the eighth embodiment does not. The position of the mirror coating surface 1301b in FIG. 13 is arranged to be coincident with the position of the reflecting surface of the half mirror in FIG. 3, and the beam 1302 is slightly shifted by the distance shown by 13A relative to the beam 103 in the high-definition photographing mode shown by the dashed line in the drawing. It results from the thickness of the double-sided mirror 1301, and correction of this displacement will be described later. The present embodiment can be formed at low cost because of the use of the mirror instead of the prism, and is free of attenuation of light quantity and occurrence of aberration caused by prism.

The tenth embodiment of the present invention is next explained referring to the drawing.

Figure 14:
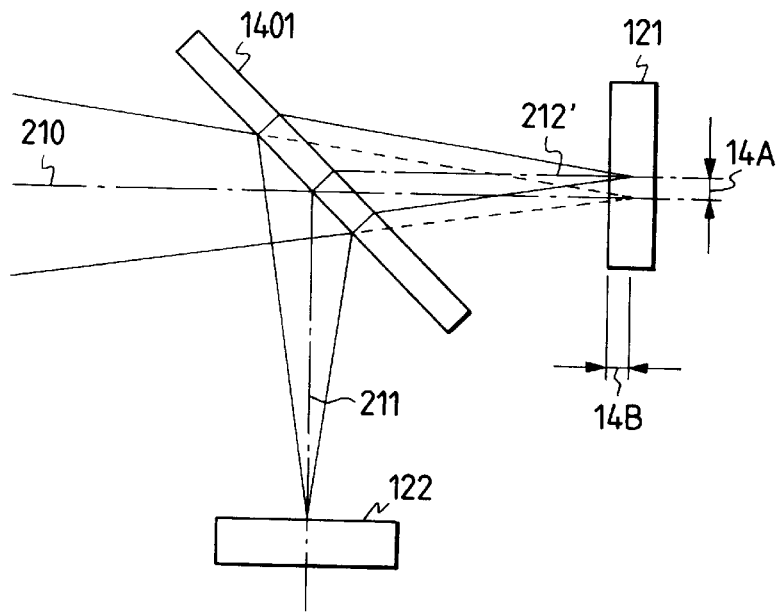
FIG. 14 is a drawing to illustrate the image pickup apparatus of the tenth embodiment according to the present invention.

The present embodiment is formed, as shown in FIG. 14, in such an arrangement that the beam splitter of the changeover optical unit in the high-definition photographing mode is replaced by a flat plate half mirror 1401. The optical low-pass filters 141, 142 are omitted to illustrate in FIG. 14. The flat plate half mirror 1401 is one obtained by forming a half mirror surface on one side of a glass flat plate, and an incident beam 210 is divided into reflected light 211 and transmitted light 212'. However, in the case of the half mirror 1401 using the glass flat plate, the transmitted light 212' is shifted by the length indicated by 14A relative to an extension of the beam 210 because of the thickness of the glass as explained in FIG. 13. Further, the optical pathlength of the transmitted light 212' changes by the length indicated by 14B because of the influence of the refractive index of the glass. However, in the case of the image pickup apparatus that can correct the change of optical pathlength as shown in FIG. 11, the two CCDs 121, 122 can be corrected to the optimum positional relation by again performing focus adjustment after changeover between the high-definition photographing mode and the stereoscopic photographing mode.

Since the displacement 14A in the direction parallel to the screen can be calculated from the thickness and refractive index of the glass and the displacement 13A in FIG. 13 can be calculated from the thickness of the double-sided mirror 1301, the pixel positional relation can be corrected, for example, to that shown in FIG. 5 upon changeover of photographing mode. Since the high-definition photographing mode requires a more accurate pixel positional relation, the CCDs 121, 122 may be preliminarily fixed in the optimum positional relation in the high-definition photographing mode. Since this method uses the cheap flat plate half mirror 1401 for the changeover optical unit, the apparatus can be produced at low cost.

The eleventh embodiment of the present invention is next explained referring to the drawings.

Figure 15:
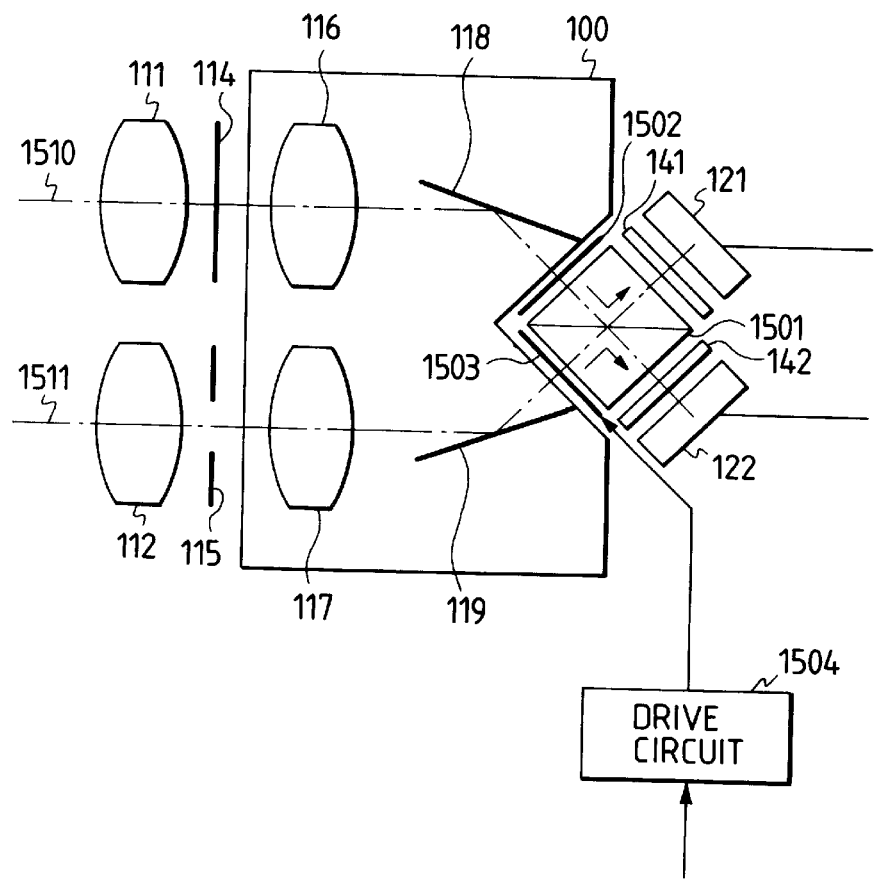
FIG. 15 is a drawing to illustrate the image pickup apparatus of the eleventh embodiment according to the present invention.
Figure 16:
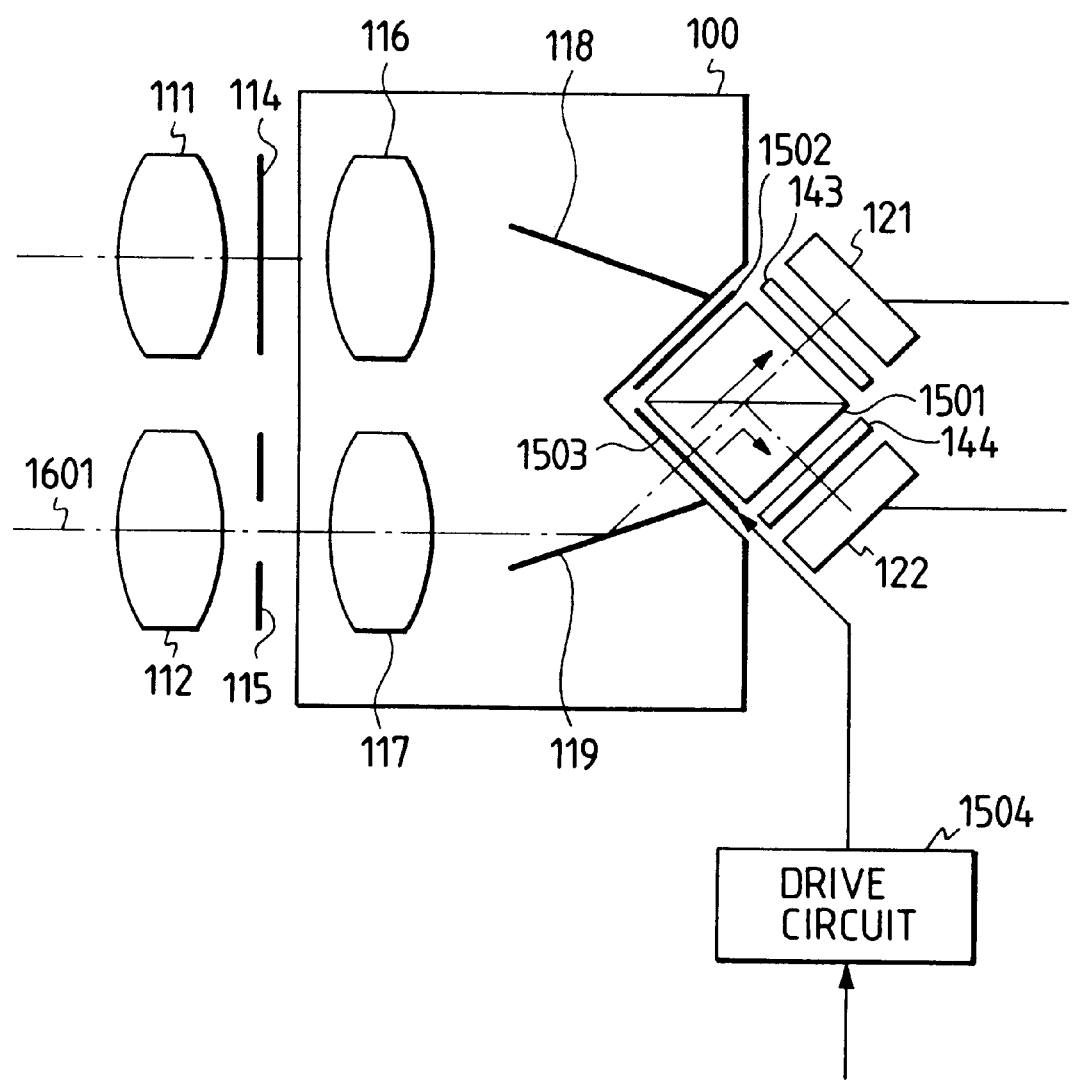
FIG. 16 is a drawing to illustrate the image pickup apparatus of the eleventh embodiment according to the present invention.

FIG. 15 and FIG. 16 show the configuration and operation for electronically changing over the optical paths, according to the present embodiment. In FIG. 15 and FIG. 16, reference numeral 1501 designates a polarizing beam splitter (PBS), 1502 a polarizing filter for transmitting only a polarized light component in the direction normal to the plane of the drawing, 1503 a liquid crystal panel, and 1504 a drive circuit of the liquid crystal panel 1503. The polarizing beam splitter 1501 reflects only the polarized light component perpendicular to the plane of the drawing by its reflecting surface, but transmits only the polarized light component in the direction along the plane of the drawing. The liquid crystal panel 1503 can change the polarized light component transmitted, under control of the drive circuit 1504.

The operation in the stereoscopic photographing mode of the present embodiment is explained based on FIG. 15. Among incident light 1510 incident through the objective lens 111, only the polarized light component in the direction normal to the plane of the drawing travels through the polarizing filter 1502 to be reflected by the PBS 1501 and then to form an image on the CCD 121. In this stereoscopic photographing mode the liquid crystal panel 1503 is controlled so as to transmit only the polarizing light component normal to the plane of the drawing, and among incident light 1511 incident through the objective 112, only the polarized light component in the direction normal to the plane of the drawing travels through the liquid crystal panel 1503 to be reflected by the PBS 1501 and then to form an image on the CCD 122. By this arrangement where the direction of polarization of the liquid crystal panel 1503 is made coincident with the direction of polarization of the polarizing filter 1502 by the control of the drive circuit 1504, the incident beams 1510, 1511 pass substantially in the same paths as those in the eighth embodiment of FIG. 12, thus realizing stereoscopic photography.

The operation in the high-definition photographing mode of the present embodiment is next explained based on FIG. 16. On this occasion the direction of polarization of the liquid crystal panel 1503 is controlled by the drive circuit 1504 so as to be inclined at approximately 450 relative to the plane of the drawing Then the stop 114 is completely closed to stop incidence of light from the side of the objective lens 111. Among the beam 1601 incident through the objective lens 112, only the polarized light component having inclination of 45° relative to the plane of the drawing in the liquid crystal panel 1503 is incident into the PBS 1501. The PBS 1501 transmits the polarized light component perpendicular to the plane of the drawing among the polarized light components, but reflects the polarized light component of the direction along the plane of the drawing, so that the beams passing through the liquid crystal panel 1503 are incident to the CCDs 121, 122 on a nearly even basis. Since the two CCDs 121, 122 are in the pixel positional relation, for example, as shown in FIG. 5, high-definition photography can be realized. The apparatus of the present embodiment has the changeover optical unit composed of the polarizing filter, the PBS, and the liquid crystal panel, which can change over the photographing mode between the stereoscopic photographing mode and the high-definition photographing mode only by an electric signal without having a moving part such as a sliding mechanism, thereby facilitating assembling of apparatus and shortening the response time of changeover.

Next explained with reference to the drawing is the twelfth embodiment of the present invention where beams incident through respective objective lenses are guided independently of each other through a lens system common to the plurality of lenses to a plurality of associated CCDs.

Figure 17:
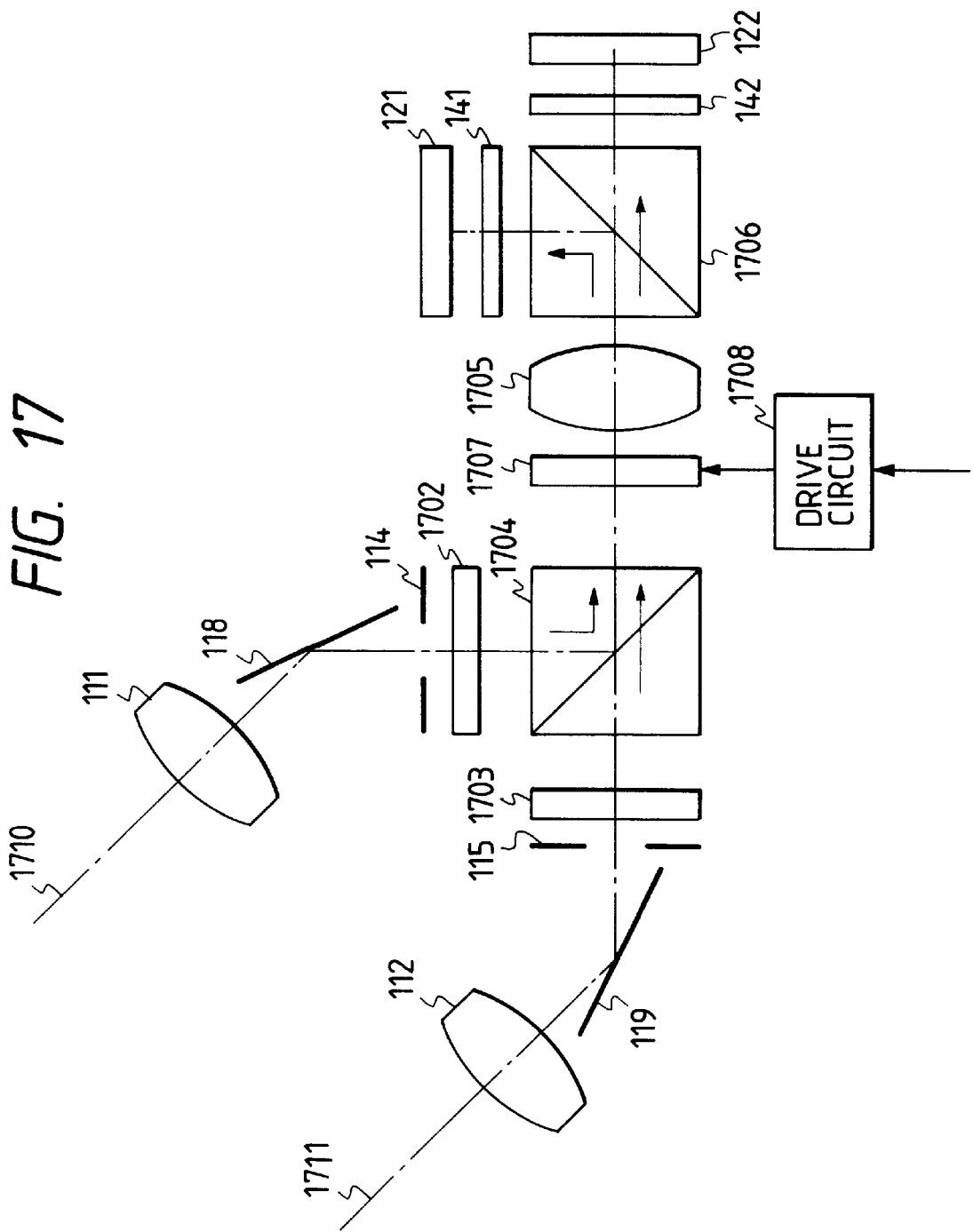
FIG. 17 is a drawing to illustrate the image pickup apparatus of the twelfth embodiment according to the present invention

The present embodiment, as shown in FIG. 17, has a common second group lens, in which reference numerals 118, 119 denote total reflection mirrors, 1702 a polarizing filter for transmitting only the polarized light component perpendicular to the plane of the drawing, 1703 a polarizing filter for transmitting only the polarized light component parallel to the plane of the drawing, 1704, 1706 polarizing beam splitters (PBSs) having the same characteristics as the PBS 1501 in FIG. 15, 1705 a second group lens, 1707 a filter capable of rotating polarized light, such as a pi cell, and 1708 a drive circuit of the filter 1707.

In the stereoscopic photographing mode of the present embodiment, the filter 1707 is controlled so as not to rotate polarized light. The beam 1710 incident through the right objective 111 is reflected by the total reflection mirror 118, and the polarizing filter 1702 transmits only the polarized light component perpendicular to the plane of the drawing. Further, the beam 1710 is reflected by the PBS 1704 to pass through the filter 1707 and second group lens 1705 and is reflected by the PBS 1706 to be guided to the CCD 121. The beam 1711 incident through the left objective 112 travels through the polarizing filter 1703, which extracts only the polarized light component parallel to the plane of the drawing. The polarized light component thus extracted travels linearly on the drawing through the PBS 1704, filter 1707, second group lens 1705, and PBS 1706 to reach the CCD 122. After guided in this manner, the beams 1710, 1711 incident through the objectives 111, 112 are photoelectrically converted by the CCDs 121, 122, respectively, thereby obtaining signals for stereoscopic image.

In the high-definition photographing mode of the present embodiment, the filter 1707 is controlled to rotate the polarized light 45°. The stop 114 is completely closed to interrupt the incident light 1710 through the objective 111. The beam 1711 incident through the objective 112 is incident into the polarizing filter 1703, which extracts the polarized light component parallel to the plane of the drawing. The polarized light component thus extracted travels through the PBS 1704 and the filter 1707 rotates an angle of polarization of the beam 45°. After passing through the second group lens 1705, this beam is nearly evenly separated by the PBS 1706 to form images on the respective CCDs 121, 122. If the CCDs 121, 122 are arranged, for example, in the positional relation as shown in FIG. 5, a high-definition image can be obtained with high resolution.

Here, the focal point and focus adjustment of the image pickup apparatus of the present embodiment is carried out mainly by the second group lens 1705. It is generally known that to achieve a three-dimensional effect is hard in the stereoscopic photography if the left and right lenses have different focal lengths and focus states. In contrast with it, this apparatus has no difference of lens conditions between the left and right images, because the common second group lens is used to adjust the focal length and focus state. Namely, the image pickup conditions become identical to the plurality of images, thereby enabling to obtain more stereoscopic or higher-definition images.

As explained above, the stereoscopic image and the high-definition plane image can be obtained by changeover between the first means and the second means, according to the present invention. In addition, the apparatus according to the invention does not need accurate control of the vergence angle or high-precision drive of lens in order to attain the plane image, as required in the conventional apparatus, and it can be constructed of the simple circuits without having to use the complex correlation arithmetic unit and image synthesizing circuit with large dissipation power. Further, because the signal processing is fundamentally free of the influence due to the production dispersion and the difference in aberration characteristics of the lenses in the photography of plane image, the high-definition plane image can be always attained anywhere on the screen. Accordingly, the invention presents the effect that the compact, light, and cheap image pickup apparatus can perform both stereoscopic photography and plane photography with very good quality by itself.

Having described preferred embodiments of the invention in detail with reference to the accompanying drawings, it is to be understood that the present invention is not limited to those precise embodiments and that many changes and modifications may be effected therein by one skilled in the art without departing from the spirit and scope of the invenion as defined in the appended claims.

What is claimed is:

1. An image pickup apparatus comprising:
    a plurality of lenses each for condensing light from an object therethrough;
    a plurality of image pickup elements for converting the light condensed by said lenses into an electric signal; and
    light guide control means for controlling the apparatus so as to guide light beams condensed respectively by said plurality of lenses to said plurality of image pickup elements, said light guide control means being selected between a first and a second positions to effect first and second modes, the first mode being a mode in which the light condensed by one of said plurality of lenses is divided and the divided light beams are guided to said plurality of image pickup elements respectively, and the second mode being a mode in which respective light beams condensed by said plurality of lenses, which have azimuth differences therebetween, are each guided to a respective corresponding image pickup element.

2. An apparatus according to claim 1, wherein said plurality of image pickup elements are arranged so that positions on said plurality of image pickup elements, at which the divided light beams are incident respectively, are offset to each other by one pixel.

3. An apparatus according to claim 2, wherein said plurality of image pickup elements are driven by a common clock.

4. An apparatus according to claim 1, wherein said plurality of image pickup elements are two in number.

5. An apparatus according to claim 1, said control means comprising an optical unit movable in a direction perpendicular to the optical axis of the light incident onto the lenses, and wherein when said first mode is selected the light condensed by the lenses is incident onto a first portion of said optical unit and when said second mode is selected said optical unit is moved so that the light condensed by the lenses is incident onto a second portion of said optical unit.

6. An apparatus according to claim 5, wherein in the first mode, light beams incident onto respective ones of the lenses is guided so that the incident light beams cross each other in said optical unit.

7. An apparatus according to claim 5, wherein positions of images formed on pickup surfaces of the image pickup elements can be changed by changing at least either one of relative positions of said plurality of image pickup elements and a position of said optical unit.

8. An apparatus according to claim 5, wherein positions of images formed on pickup surfaces of the image pickup elements can be changed by changing at least either one of relative positions of said plurality of image pickup elements and a position of said optical unit, thereby changing a signal processing method depending on the positions of the images.

9. An apparatus according to claim 5, further comprising displacement detecting means for detecting displacements of images formed on pickup surfaces of the image pickup elements, and control means for controlling at least either one of positions of the image pickup elements and a position of said optical unit, based on an output from said displacement detecting means.

10. An apparatus according to claim 5, wherein said second portion is a space.

11. An apparatus according to claim 5, wherein said second portion is a combination of two prism type total reflection mirrors.

12. An apparatus according to claim 5, wherein said second portion is a flat plate type double-sided mirror.

13. An apparatus according to claim 5, wherein said first portion is a combination of two prism type half mirrors.

14. An apparatus according to claim 5, wherein said first portion is a flat plate half mirror.

15. An apparatus according to claim 1, further comprising first and second optical low-pass filters whose characteristics are different from each other, and wherein said first optical low-pass filter is inserted into an optical path in the first mode, and said second optical low-pass filter is inserted into the optical path in the second mode.

16. An apparatus according to claim 1, wherein said apparatus is structured to control an angle, on a side of the apparatus toward the object, between a plurality of light beams condensed through said plurality of lenses.

17. An apparatus according to claim 16, wherein said plurality of image pickup elements are image pickup elements having more pixels than pixels corresponding to standard signals and the controlling of the angle is substantially effected by moving read-out areas of outputs from the image pickup elements.

18. An apparatus according to claim 16, wherein the controlling of the angle is effected by moving said lenses in directions nearly perpendicular to directions of incidence of the light beams into said lenses.

19. An apparatus according to claim 16, further comprising deflection means for deflecting an optical axis of the light beams with respect to all of said plurality of lenses, and wherein said apparatus is structured to control the angle on the object side between the plurality of light beams by using said deflection means.

20. An apparatus according to claim 16, wherein the controlling of the angle is substantially effected by moving said plurality of image pickup elements in directions substantially perpendicular to the direction of incidence of the light beams into the image pickup elements.

21. An apparatus according to claim 1, wherein respective optical axes in said first mode and said second mode are coincident with each other and have optical pathlengths equal to each other.

22. An apparatus according to claim 1, wherein changes of optical axes and optical pathlengths caused by changeover between said first mode and said second mode are corrected by adjusting a position of at least one of said plurality of lenses and said image pickup elements.

23. An apparatus according to claim 1, further comprising image reversing means for reversing an image, and wherein images reversed between said plurality of lenses and said plurality of image pickup elements can be corrected by said image reversing means, which is provided at a stage after said plurality of image pickup elements.

24. An apparatus according to claim 1, further comprising polarization means for switching between the first mode and the second mode by controlling a polarization component of the light beams condensed by said lenses, which pass through said polarization means.

25. An image pickup apparatus comprising:
a plurality of image pickup elements for converting incident light into an electric signal; and
an optical unit including a first optical system for dividing one incident light beam and guiding divided light beams to said plurality of image pickup elements respectively, and a second optical system for guiding a plurality of incident light beams to corresponding image pickup elements respectively.

26. An apparatus according to claim 25, wherein said optical unit is movable in a direction perpendicular to an optical axis of the incident light to switch between said first optical system and said second optical system.

27. An image pickup apparatus according to claim 25, further comprising:
image producing means for producing an image by a first algorithm when the first optical system of said optical unit is used, and producing an image by a second algorithm when the second optical system of said optical unit is used.

28. An apparatus according to claim 27, wherein a plurality of image pickup elements are arranged so that positions of the incident light on said plurality of image pickup elements are offset with respect to each other by one pixel.

29. An apparatus according to claim 28, wherein said plurality of image pickup elements output the electric signals respectively according to a common clock.

* * * * *

UNITED STATES PATENT AND TRADEMARK OFFICE
CERTIFICATE OF CORRECTION

PATENT NO. : 5,907,434

DATED : May 25, 1999

INVENTOR(S) : MASAYOSHI SEKINE ET AL.

Page 1 of 3

It is certified that error appears in the above-identified patent and that said Letters Patent is hereby corrected as shown below:

On the title page, item:

[56] REFERENCES CITED

Attorney, Agent, or Firm- "Fitzpatrick,Cella,Harper & Scinto" should read --Fitzpatrick, Cella, Harper & Scinto--.

COLUMN 1

Line 52, "achieving" should read --achieving a--; and
Line 54, "gaining" should read --achieving--.

COLUMN 6

Line 33, "drawings" should read --drawings.--.

COLUMN 7

Line 9, "image." should read --image to be obtained.--; and
Line 28, "and" should read --and therefore--.

COLUMN 9

Line 67, "moire" should read --moiré--.

UNITED STATES PATENT AND TRADEMARK OFFICE
CERTIFICATE OF CORRECTION

PATENT NO. : 5,907,434

DATED : May 25, 1999

INVENTOR(S) : MASAYOSHI SEKINE ET AL.

It is certified that error appears in the above-identified patent and that said Letters Patent is hereby corrected as shown below:

COLUMN 12

Line 17, "direction" should read --direction.--.

COLUMN 13

Line 2, "configuration" should read --configuration.--; and
    Line 21, "direction" should read --direction.--.

COLUMN 14

Line 35, "readjustment" should read --readjustment.--; and
    Line 43, "embodiment" should read --embodiment.--.

COLUMN 16

Line 30, "450" should read --45°--; and
    Line 31, "drawing" should read --drawing.--.

UNITED STATES PATENT AND TRADEMARK OFFICE
CERTIFICATE OF CORRECTION

PATENT NO.    : 5,907,434
DATED         : May 25, 1999
INVENTOR(S)   : MASAYOSHI SEKINE ET AL.

It is certified that error appears in the above-identified patent and that said Letters Patent is hereby corrected as shown below:

COLUMN 18

Line 6, "invenion" should read --invention--; and
Line 19, "a" (second occurrence) should be deleted.

Signed and Sealed this

Eighteenth Day of April, 2000

Attest:

Q. TODD DICKINSON

*Attesting Officer*     *Director of Patents and Trademarks*